US008397968B2

(12) United States Patent
Gaudron

(10) Patent No.: US 8,397,968 B2
(45) Date of Patent: Mar. 19, 2013

(54) SETTING TOOL ARRANGEMENT

(75) Inventor: Paul Gaudron, Stratford, CT (US)

(73) Assignee: Black & Decker Inc., Newark, DE (US)

(*) Notice: Subject to any disclaimer, the term of this patent is extended or adjusted under 35 U.S.C. 154(b) by 224 days.

(21) Appl. No.: 12/876,544

(22) Filed: Sep. 7, 2010

(65) Prior Publication Data

US 2011/0017796 A1 Jan. 27, 2011

Related U.S. Application Data

(63) Continuation-in-part of application No. 12/038,248, filed on Feb. 27, 2008, now abandoned.

(51) Int. Cl.
*B23Q 3/18* (2006.01)

(52) U.S. Cl. .................... 227/8; 227/9; 227/10; 227/119

(58) Field of Classification Search ................ 227/8–11; 70/61, 154; 292/130, 183, 230

See application file for complete search history.

(56) References Cited

U.S. PATENT DOCUMENTS

| | | | | |
|---|---|---|---|---|
| 2,408,181 | A | | 9/1946 | Simonton |
| 2,766,451 | A | * | 10/1956 | Gannon ............................ 227/9 |
| 2,923,940 | A | | 2/1960 | Kvavle |
| 3,081,998 | A | * | 3/1963 | Weiss ............................ 273/440 |
| 3,219,355 | A | | 11/1965 | Fujinuma |
| 3,472,441 | A | | 10/1969 | Courtiex |
| 3,553,876 | A | * | 1/1971 | Engler ........................... 42/1.14 |
| 3,677,346 | A | | 7/1972 | Tamplen |
| 3,797,721 | A | | 3/1974 | Clumb |
| 3,878,757 | A | | 4/1975 | Puklus, Jr. |
| 3,988,849 | A | * | 11/1976 | Connellan et al. ........... 42/70.09 |
| 4,359,206 | A | | 11/1982 | McCreery |
| 4,479,599 | A | | 10/1984 | Conrad |
| 4,869,625 | A | | 9/1989 | Stone |
| 5,415,314 | A | | 5/1995 | McCollum |
| 5,429,291 | A | | 7/1995 | Thompson |
| 5,462,548 | A | * | 10/1995 | Pappas et al. ................... 606/80 |
| 5,465,893 | A | * | 11/1995 | Thompson ......................... 227/8 |
| 5,518,161 | A | * | 5/1996 | Thompson ......................... 227/8 |
| 5,599,050 | A | | 2/1997 | Tinsley |
| 5,683,126 | A | | 11/1997 | De Vivo et al. |
| 5,992,723 | A | | 11/1999 | Lee |
| 5,997,052 | A | | 12/1999 | Reeb et al. |
| 6,364,190 | B1 | * | 4/2002 | Tor .................................. 227/10 |
| 6,478,301 | B1 | | 11/2002 | Witmeyer |
| 7,014,085 | B2 | | 3/2006 | McCullough |
| 7,090,107 | B2 | * | 8/2006 | Buechel et al. .................... 227/8 |
| 7,565,991 | B2 | * | 7/2009 | Erhardt ............................. 227/8 |
| 2002/0116788 | A1 | | 8/2002 | Pompei |
| 2004/0245308 | A1 | | 12/2004 | Arnold et al. |
| 2005/0011927 | A1 | * | 1/2005 | McCullough ................... 227/10 |
| 2007/0246899 | A1 | | 10/2007 | Haimer |
| 2008/0296338 | A1 | * | 12/2008 | Blessing et al. .................. 227/8 |
| 2008/0302849 | A1 | * | 12/2008 | Blessing et al. .............. 227/110 |

OTHER PUBLICATIONS

Comments Under Article 19; Dec. 28, 2009.

Notification of Transmittal of the International Search Report and The Written Opinion of the International Searching Authority, or the Declaration; International Searching Authority; Mailed Oct. 28, 2009.

* cited by examiner

*Primary Examiner* — Lindsay Low
(74) *Attorney, Agent, or Firm* — Cantor Colburn LLP

(57) ABSTRACT

A setting tool arrangement includes a stock of a setting tool having one or more sleeve stops. A barrel of a setting tool is slidably receivable in the stock. A sleeve is interactive with the barrel to move to a position allowing the barrel to move when pointed in a direction opposite the direction of gravity and to a position of interference with the one or more sleeve stops thus preventing the barrel from moving when pointed in a direction approximating the direction of gravity.

17 Claims, 6 Drawing Sheets

SETTING TOOL ARRANGEMENT

CROSS-REFERENCE TO RELATED APPLICATIONS

This application is a continuation-in-part of application Ser. No. 12/038,248 filed on Feb. 27, 2008 and claims priority thereto.

BACKGROUND

Setting tools are enormously useful for speeding any job requiring the setting of a large number of fasteners. Commonly, such tools are used in connection with setting fasteners in concrete or other hard materials. Because of the materials into which the fasteners are normally set, a substantial amount of motive force is required to be generated to set the fastener. This force is usually generated by the combustion of an energetic or accelerant material. While these tools are undeniably beneficial, they do require care in use to prevent unintended discharge of the fastener at a time when its discharge is unintended. Arrangements that assist in avoiding unintended discharge are always well received by the art.

SUMMARY

A setting tool arrangement includes a stock of a setting tool having one or more sleeve stops; a barrel of a setting tool slidably receivable in the stock; and a sleeve interactive with the barrel to move to a position allowing the barrel to move when pointed in a direction opposite the direction of gravity and to a position of interference with the one or more sleeve stops thus preventing the barrel from moving when pointed in a direction approximating the direction of gravity.

BRIEF DESCRIPTION OF THE DRAWINGS

Referring now to the drawings wherein like elements are numbered alike in the several Figures.

DETAILED DESCRIPTION

Figure 1:
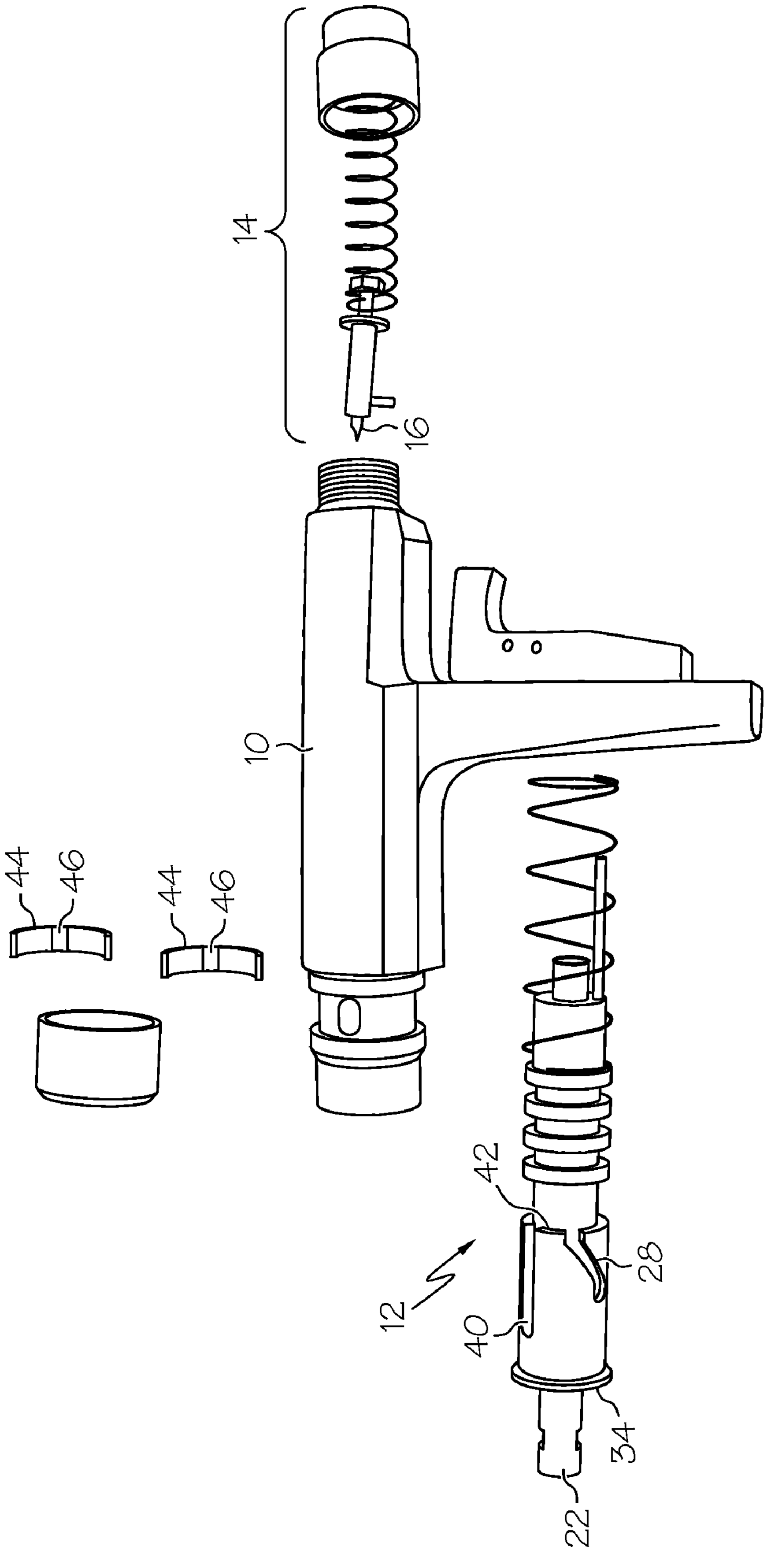
FIG. 1 is an exploded view of a setting tool to provide for visual environment for the arrangement illustrated alone in FIG. 2.
Figure 2:
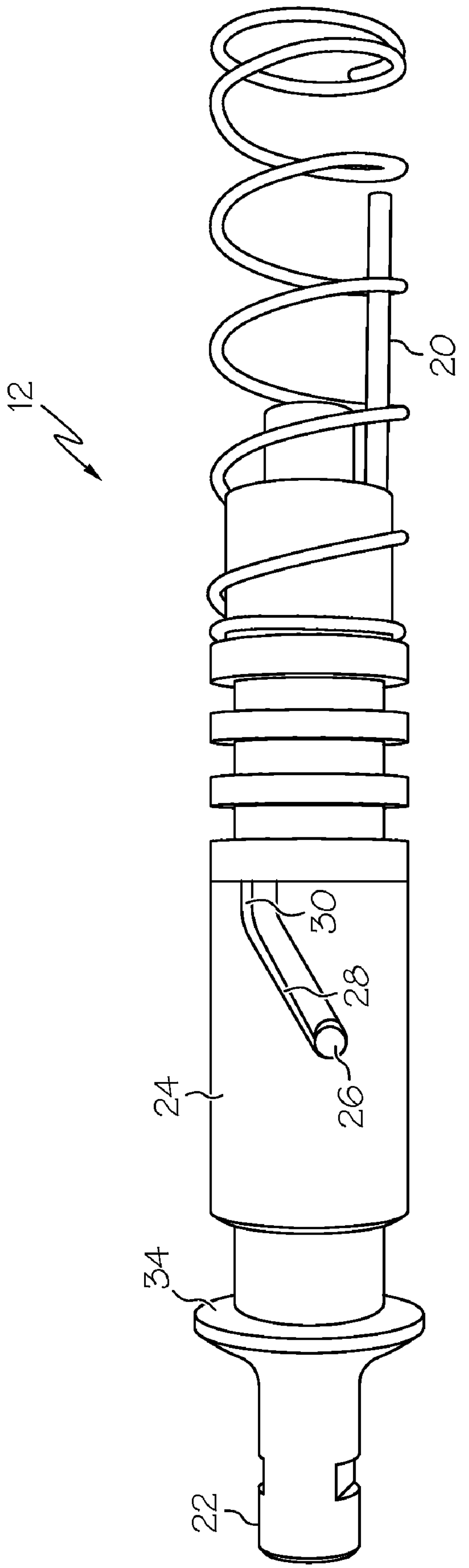
FIG. 2 is a view of a barrel of a setting tool such as that illustrated in FIG. 1 configured as taught herein in an actuation position.

Referring to FIGS. 1 and 2 simultaneously, one of skill in the art will recognize a setting tool stock 10 into which a barrel 12 is slidably receivable. A firing pin assembly 14 is disposable in operable communication with the stock 10 to under compressive conditions of the barrel 12 into the stock 10, the firing pin assembly is automatically set and released. Upon release of the firing pin assembly 14, a firing pin 16 operates to ignite a volume of energetic or accelerant material to create expanding gas thereby driving a fastener (not shown) through the barrel 12 and into a workpiece. In such a tool, having no additional triggering action, the tool will indeed actuate upon any actual compression of the barrel 12 into the stock 10 of the tool. As the particular configuration of setting tool illustrated is for ceiling setting applications, it is often used on ladders or with extension members. In either case, the potential for dropping the device is increased. The dropping of the tool can cause unintended actuation and therefore wasting of accelerant or energetic materials, which are not inexpensive. In order to avoid this eventuality, the configuration of FIG. 2 has been devised by the inventor hereof.

Figure 3:
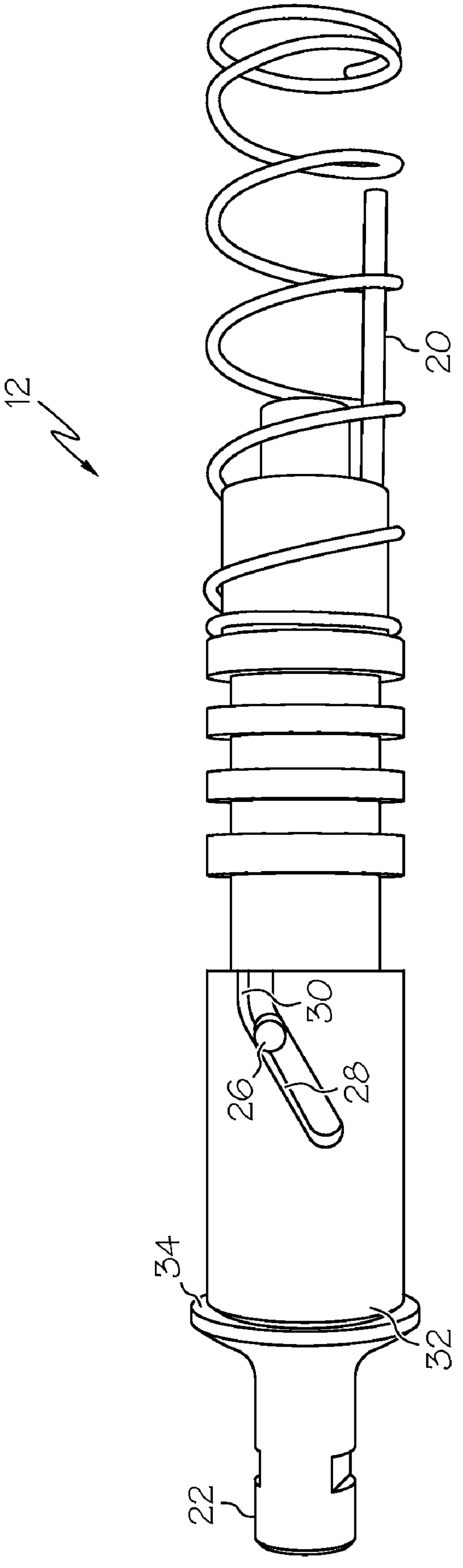
FIG. 3 is the view of FIG. 2 in a non-actuation position.
Figure 4:
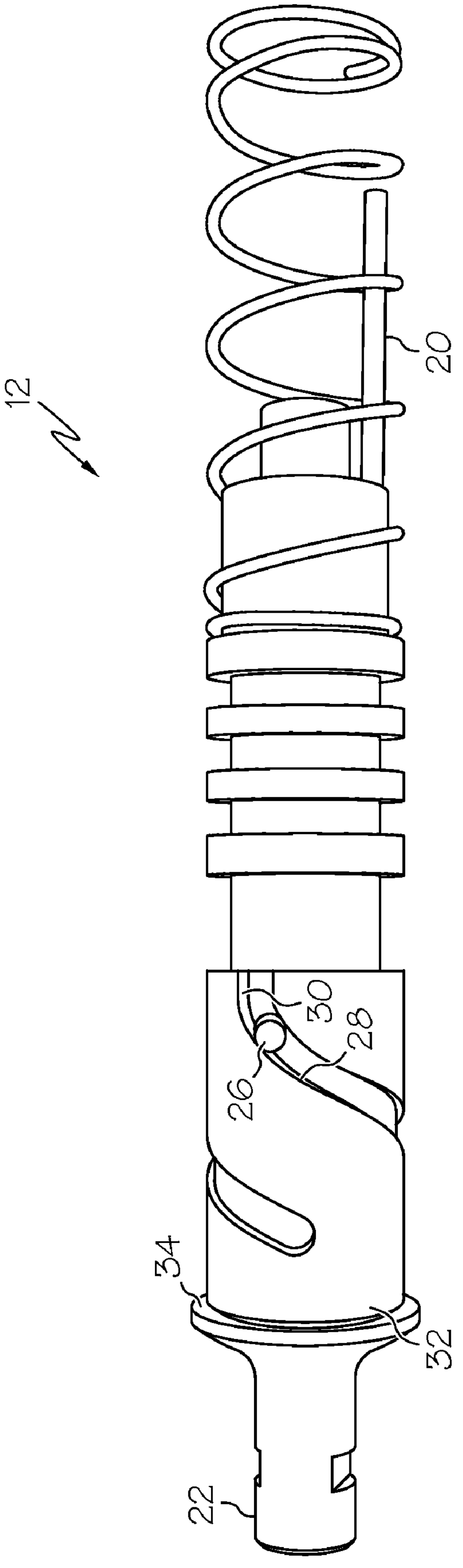
FIG. 4 is a view of another embodiment of a barrel of a setting tool.

Referring to FIG. 2, the barrel 12, will be generally recognized by one of skill in the setting tool art as having an elongate form, a triggering extension 20, barrel nose 22, etc. What the person of ordinary skill in the art will not recognize is a sleeve 24 disposed about the barrel 12. The barrel 12, in this embodiment, includes at least one lug 26 that is received in a groove 28 of the sleeve 24. In one embodiment, the groove 28 extends all the way through a radial dimension of the sleeve 24. It will be understood that the groove 28 may extend partially through the radial dimension of the sleeve with no functional distinction. In the illustrated embodiment, the groove 28 is at an angle of about 40 degrees to about 50 degrees relative to an axis of the barrel 12. The angle is such that with the nose 22 facing in the direction in which gravity pulls, the sleeve 24 slides closer to nose 22 and the lug 26 moves toward axial groove extension 30, as illustrated in FIG. 3. In some embodiments, as shown in FIG. 4, the groove 28 may be helical. As shown with reference to FIGS. 2 and 3, the sleeve 24 rotates about the axis of the barrel 12 as the sleeve 24 slides over the barrel 12 due to the angle of the groove 28. Further, as best shown in FIG. 1, the sleeve 24 includes one or more firing openings 40 extending substantially axially from a stock end 42 of the sleeve 24 toward the barrel nose 22.

Figure 5:
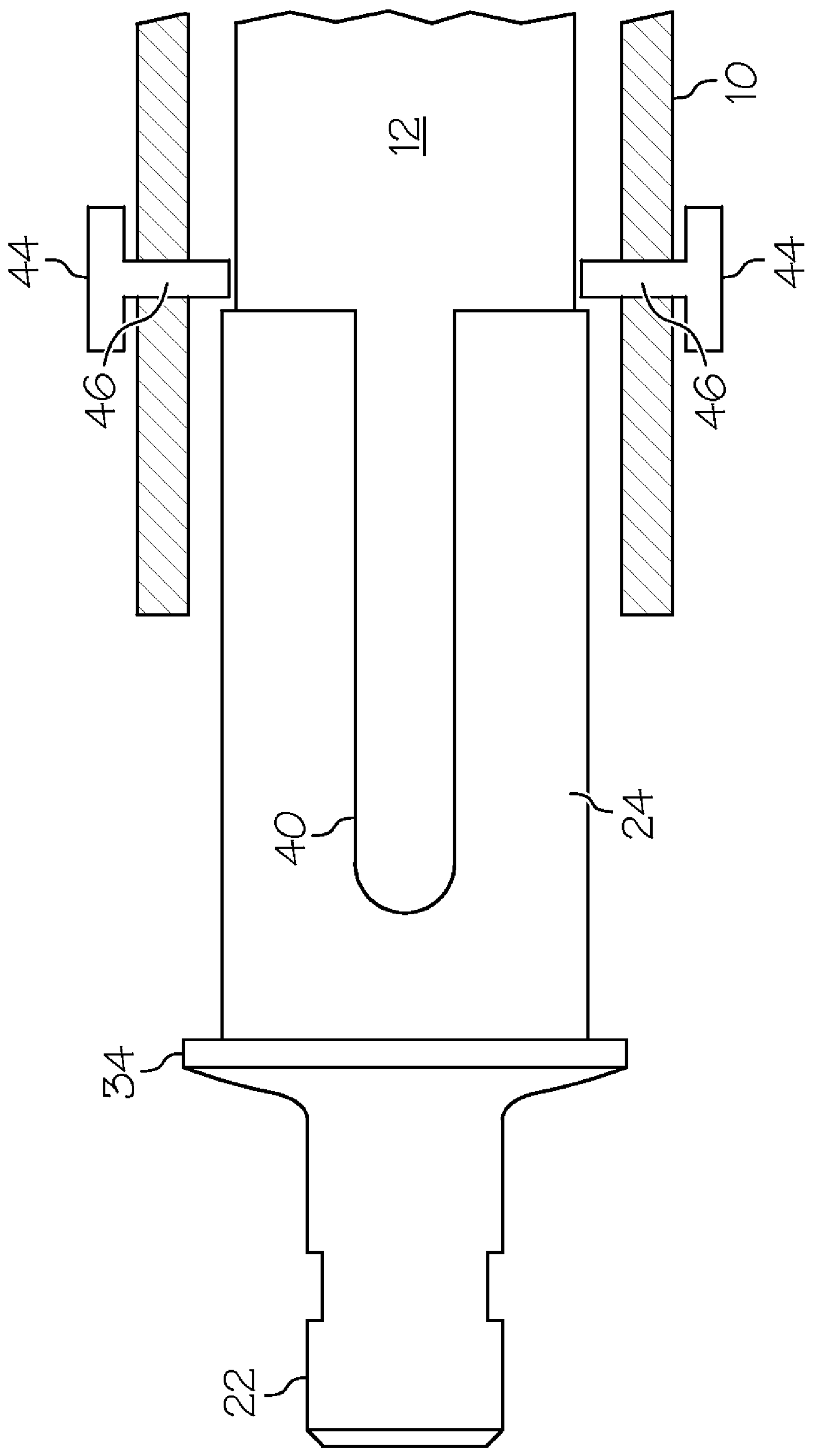
FIG. 5 is another view of a setting tool in a non-actuation position.

Referring now to FIGS. 1 and 5 simultaneously, the stock 10 includes stock collar 44. With the stock collar 44 installed at the stock 10, one or more sleeve stops 46 extend inwardly toward the barrel axis. In the position of FIG. 5, the barrel 12 cannot be compressed into the stock 10 because the one or more sleeve stops 46 interfere with axial movement of the sleeve 24, which is in contact with barrel shoulder 34, thereby preventing the barrel 12 from being compressed into the stock 10.

Figure 6:
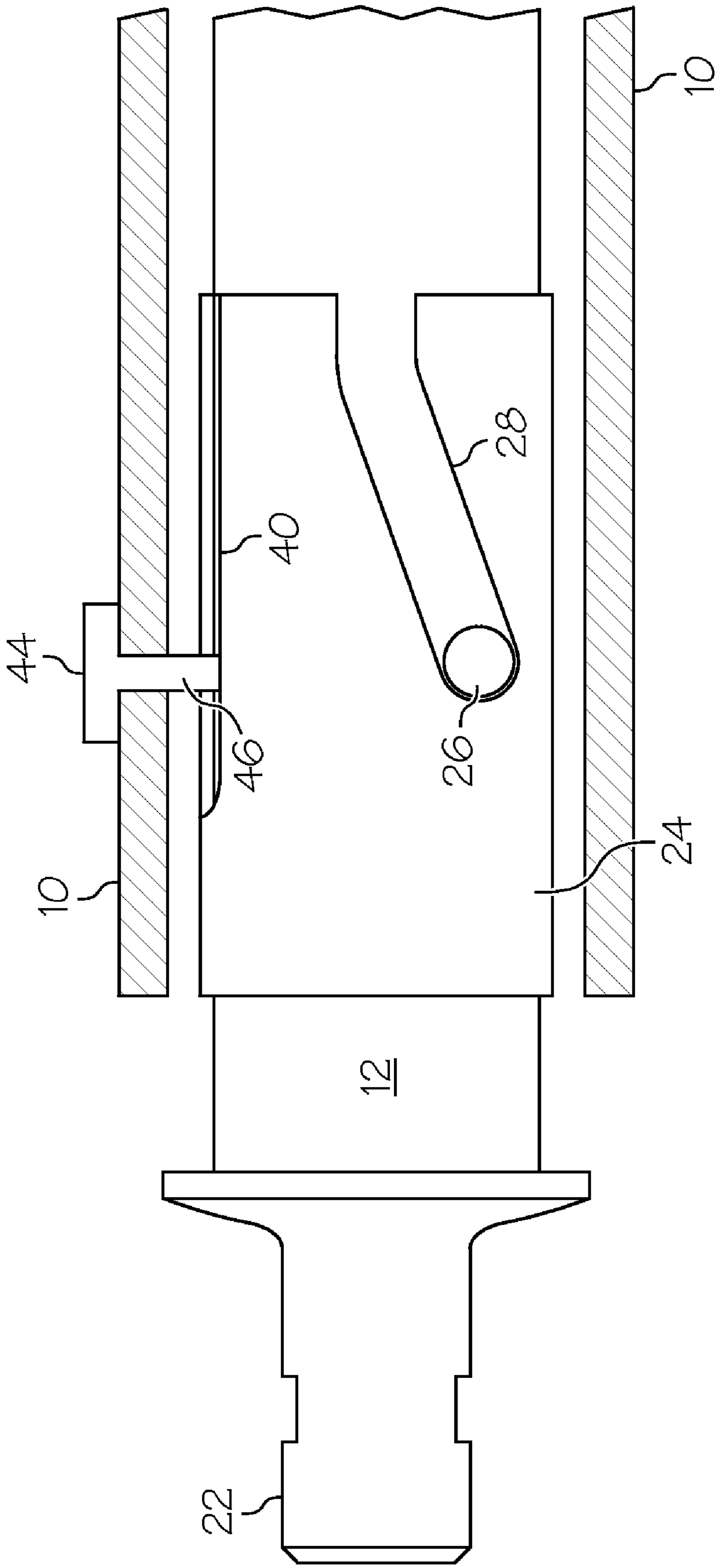
FIG. 6 is another view of a setting tool in an actuation position.

Thus, with the nose 22 pointed downward, the barrel 12 cannot be pushed into the stock 10. Without this action, the tool also cannot be discharged. In the position of FIG. 3 then, the tool is effectively locked. In contrast, referring now to FIG. 6, when the nose 22 of the tool is pointed in a direction substantially opposite the pull of gravity, the sleeve 24 will automatically move to the position illustrated in FIG. 2. In this position, the one or more sleeve stops 46 align circumferentially with the one or more firing openings 40. With the one or more sleeve stops 46 aligned with the one or more firing openings 40, the barrel 12 is able to move into the stock 10 to actuate the tool.

While the invention has been illustrated in one possible form, it is to be appreciated that the component parts may be reversed while retaining the function hereof. More specifically, the lug 26 may be positioned on the inside dimension of the sleeve 24 and the groove positioned on the outside dimension of the barrel 12. In this configuration the tool works identically to that described above.

While exemplary embodiments have been shown and described, modifications and substitutions may be made thereto without departing from the spirit and scope of the invention. Accordingly, it is to be understood that the present invention has been described by way of illustrations and not limitation.

The invention claimed is:

1. A setting tool arrangement comprising:

a stock of a setting tool including one or more sleeve stops:

a barrel of a setting tool slidably receivable in the stock; and a sleeve interactive with the barrel and configured to move via gravity alone to a position allowing the barrel to move when pointed in a direction opposite the direction of gravity and to a position of interference with the one or more sleeve stops thus preventing the barrel from moving when pointed in a direction approximating the direction of gravity.

2. The arrangement of claim 1, wherein the sleeve includes one or more firing openings circumferentially alignable with the one or more sleeve stops to allow the barrel to move when pointed in the direction opposite the direction of gravity.

3. The arrangement of claim 2, wherein the one or more firing openings extend substantially axially along the sleeve.

4. The arrangement of claim 1, wherein the one or more sleeve stops extend inwardly toward an axis of the barrel.

5. The arrangement as claimed in claim 1 wherein the sleeve includes a groove.

6. The arrangement as claimed in claim 5 wherein the groove extends through a radial dimension of the sleeve.

7. The arrangement as claimed in claim 5 wherein the groove is angled relative to an axis of the sleeve.

8. The arrangement as claimed in claim 7 wherein the groove is helical.

9. The arrangement as claimed in claim 7 wherein the angle is from about 40 degrees to about 50 degrees.

10. The arrangement as claimed in claim 5 wherein the barrel includes a lug engaged with the groove in the sleeve.

11. A setting tool arrangement comprising:

a stock of a setting tool including one or more sleeve stops:

a barrel of a setting tool slidably receivable in the stock; and a sleeve interactive with the barrel to move via gravity to a position allowing the barrel to move when pointed in a direction opposite the direction of gravity and to a position of interference with the one or more sleeve stops thus preventing the barrel from moving when pointed in a direction approximating the direction of gravity, wherein the sleeve autorotates to an actuatable position upon the barrel being pointed in a direction generally opposing the direction of pull of gravity.

12. A setting tool arrangement comprising:

a stock of a setting tool including one or more sleeve stops:

a barrel of a setting tool slidably receivable in the stock; and a sleeve interactive with the barrel to move via gravity to a position allowing the barrel to move when pointed in a direction opposite the direction of gravity and to a position of interference with the one or more sleeve stops thus preventing the barrel from moving when pointed in a direction approximating the direction of gravity, wherein the sleeve autorotates to a non-actuatable position upon the barrel being pointed in a direction of the pull of gravity.

13. The arrangement as claimed in claim 1 wherein the sleeve includes an end surface that is frictionally engaged with a shoulder of the barrel when the barrel is pointed in a direction of the pull of gravity.

14. The arrangement of claim 11, wherein the sleeve includes one or more firing openings circumferentially alignable with the one or more sleeve stops to allow the barrel to move when pointed in the direction opposite the direction of gravity.

15. The arrangement of claim 14, wherein the one or more firing openings extend substantially axially along the sleeve.

16. The arrangement of claim 12, wherein the sleeve includes one or more firing openings circumferentially alignable with the one or more sleeve stops to allow the barrel to move when pointed in the direction opposite the direction of gravity.

17. The arrangement of claim 16, wherein the one or more firing openings extend substantially axially along the sleeve.

* * * * *